United States Patent [19]

Schomburg

[11] 4,000,486
[45] Dec. 28, 1976

[54] FULL PAGE, RASTER SCAN, PROPORTIONAL SPACE CHARACTER GENERATOR

[75] Inventor: Robert Ray Schomburg, Boulder County, Colo.

[73] Assignee: International Business Machines Corporations, Armonk, N.Y.

[22] Filed: Dec. 22, 1975

[21] Appl. No.: 643,566

Related U.S. Application Data

[63] Continuation of Ser. No. 506,806, Sept. 17, 1974, abandoned, which is a continuation-in-part of Ser. No. 408,980, Oct. 23, 1973, abandoned.

[52] U.S. Cl. .................. 340/172.5; 340/324 AD; 178/30
[51] Int. Cl.² ............................. G06F 3/14
[58] Field of Search ........ 445/1; 340/172.5, 324 A, 340/324 AD; 178/15, 25, 30

[56] References Cited

UNITED STATES PATENTS

| | | | |
|---|---|---|---|
| 2,768,050 | 10/1956 | Alden | 346/33 |
| 3,047,871 | 7/1962 | Hider et al. | 346/110 |
| 3,278,683 | 10/1966 | Ashby et al. | 178/30 |
| 3,283,305 | 11/1966 | Hans et al. | 340/172.5 |
| 3,422,419 | 1/1969 | Mathews et al. | 340/172.5 |
| 3,510,866 | 5/1960 | Kronick et al. | 340/324 A |
| 3,546,681 | 12/1970 | Korn et al. | 340/172.5 |
| 3,568,178 | 3/1971 | Day | 340/324 A |
| 3,622,701 | 11/1971 | Gardner | 178/30 |
| 3,624,607 | 1/1971 | Mita | 178/30 X |
| 3,626,824 | 12/1971 | Kolb et al. | 95/4.5 |
| 3,634,828 | 1/1972 | Myers | 340/172.5 |
| 3,696,387 | 10/1972 | Nussbaum | 178/30 X |
| 3,697,958 | 10/1972 | Larew | 340/172.5 |
| 3,729,714 | 4/1973 | Heard | 340/172.5 |
| 3,760,376 | 9/1973 | Tanner | 340/172.5 |
| 3,768,091 | 10/1973 | Naka | 340/324 AD |
| 3,811,113 | 5/1974 | Saito et al. | 340/172.5 |
| 3,868,673 | 2/1975 | Mau et al. | 340/324 AD |
| 3,893,075 | 7/1975 | Orban et al. | 340/172.5 |
| 3,895,374 | 7/1975 | Williams | 340/324 AD |
| 3,896,428 | 7/1975 | Williams | 340/324 AD |

*Primary Examiner*—Gareth D. Shaw
*Assistant Examiner*—Jan E. Rhoads
*Attorney, Agent, or Firm*—Homer L. Knearl; Gunter A. Hauptman

[57] ABSTRACT

A character generator for full page, raster scan printing is controlled to sequentially generate parts of different characters in a single scan. Further the character generation control independently stores for each row of text to be generated, the order position of a character or symbol being generated and the remaining number of raster scans required to complete generation of the symbol. Use of this control permits the sequential generation of parts of symbols even though the symbols have different relative widths and the full page raster scans are in a direction normal to the lines of text on the page. Use of the control also permits text assembly in a page memory to be generated in printed lines of text that extend either parallel or normal to the direction of light spot scanning by selecting predetermined alternative page memory access sequences. By the use of "white space" indicating control codes in combination with the character generation control of this invention it is possible to materially reduce the size of memory required to store a page of text.

11 Claims, 10 Drawing Figures

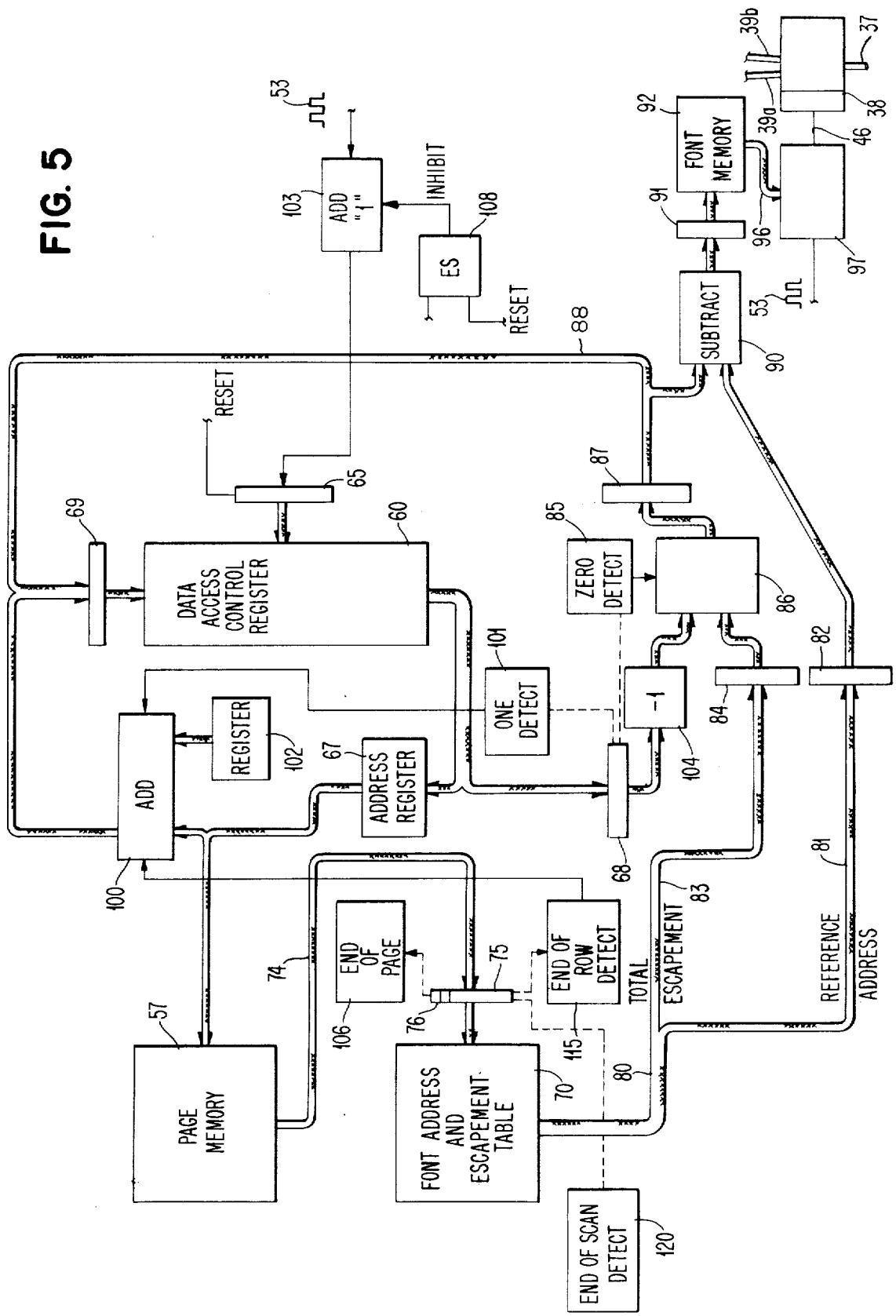

FULL PAGE, RASTER SCAN, PROPORTIONAL SPACE CHARACTER GENERATOR

CROSS REFERENCE TO RELATED APPLICATIONS

This application is a continuation of application Ser. No. 506,806 filed Sept. 17, 1974, now abandoned, which is in turn a continuation-in-part of application Ser. No. 408,980, filed Oct. 23, 1973, now abandoned.

FIELD OF THE INVENTION

This invention relates to the field of matrix printers and display devices wherein symbols such as alphanumeric characters are generated by controlling a spot forming device that traverses an entire area into which all possible characters can be fitted. More particularly, this invention relates to mechanism for controlling the spot forming device as it traverses a scanning path of a raster pattern that covers the area of an entire page of text. A preferred application of the control of this invention is in an electrophotographic page printing system wherein pages are generated by a modulated light spot that traverses a fixed axial path on the surface of an electrophotographic copy drum with a modulated spot of light to selectively discharge the background or "white area" of the page being generated leaving on the photoconductive surface an electrostatic latent image of text symbols that are developed and transferred to form final copy by techniques substantially identical to those currently employed in known xerographic copy machines.

BACKGROUND OF THE INVENTION

The generation of symbols for printing or display by selecting predetermined groups of dots from a set matrix of potential dots is a highly developed art. This technique has been used in various forms for telegraph printers, cathode ray tube type computer output terminals, computer line printers and graphics quality photocomposers, to mention a few diverse examples.

The techniques and apparatus employed in xerographic copy devices have been proposed for some time for use in generating original text or pictures directly from electronic signals, rather than from the usual optically projected pre-formed image. An example of one such arrangement is found in U.S. Pat. No. 2,829,025.

A preferred configuration of an original text xerographic printer exposes a page image by progressive columnar page segments that extend parallel to the axis of the xerographic copy drum. This arrangement maximizes the page production speed of the printer by processing pages in the direction of their shorter dimension or width. Certain types of text are normally printed with lines of text that read along the long dimension of the page. An example of this type of text is familiar computer printout sheets.

It is desirable for an optical printer to be able to generate output having lines of text that extend selectively along either the long or short dimension of the page principally by the selection of type font control data that presents character matrix information that is pedetermined according to the desired character orientation. If, for example, printing is normally to occur with lines of text extending along the short dimension of the page, such printing can be controlled by a first type font data bank defining patterns for generating characters in terms of columnar or vertical raster scans or strokes. To produce writing lines extending horizontally along the long dimension of the page, a "rotated font" data bank is provided which defines patterns for generating characters by raster scans extending horizontally or along the writing line of the page. In printing either type of page the paper is fed to the printing machine in an identical manner, the only difference being the character generation control that places the image on the xerographic drum.

Printed material can be classified as having fixed or proportional spacing depending upon whether all characters regardless of their size are allotted the same horizontal spacing or are allotted an amount of horizontal spacing proportional to their size. Proportional spacing provides printing with a prestige appearance and also provides a more compact writing form that is generally found easier to read.

DISCLOSURE OF THE INVENTION

My invention provides apparatus for controlling the conversion of coded symbol identifying data into the light/dark contrast pattern required for generating printed pages in the preferred configuration of a xerographic page printer. my invention provides a page memory access control having a plurality of registers with a register associated with each widthwise extending row on a page to be printed. Each row register of the page memory access control stores an address of data within the page memory. At the address in the page memory there is a code identifying a symbol or character currently being printed in the printed page row associated with the row register. Each row register further stores information as to the number of remaining raster scans required to complete printing of the particular symbol or character currently being printed in the associated printed page row.

The page memory access control progressively presents its stored information in synchronism with the scanning motion of the exposure light spot. The individual character codes thus accessed from the page memory are translated by a table lookup translation memory that converts the character code to both a reference address in a type font memory and the total number of raster scans required for complete generation of the character. The type font memory contains the actual black/white dot information used to control the intensity of the beam during each raster scan. For each new raster scan in a row of text, the reference address is modified by the number of remaining raster scans required to complete the printing of the character in the row. In this way the character scan information in the type font memory is indexed for each scan through the character being printed.

As printing progresses the character access data stored in the various row registers of the page memory access control is updated in accordance with the horizontal progression across the page of the vertical raster. The "remaining scan" information is simply counted down as raster scans are completed. Upon display of the last scan of a given symbol, the page memory address stored in the associated row register of the page memory access control is incremented by a fixed number to thereby identify the page memory address of the succeeding character to be printed in the row of text associated with that row register.

By use of my page memory access control, as thus described, it is possible to enable printing of characters having proportional spacing in the preferred configuration of the xerographic printer. Furthermore, it is possible to display data that is pre-arranged in a page memory to produce either normal or rotated output through the use of a normal or rotated type front with much simplification through the relatively simple expedient of controlling the initialization and progression constant of the page memory access control.

In the preferred embodiment of my invention, page memory efficiency is enhanced by the use of "white space" indicating control codes such as "End of Scan" and "End of Row" codes that eliminate the need to individually code character size white spaces in large areas such as margins.

These and other objects, features and advantages of my invention will be fully understood by those skilled in the art from the following description of a specific illustrative preferred embodiment thereof, wherein reference is made to the accompanying drawing of which:

FIG. 5 is a component and data flow diagram showing the major features of the character generator employed in my invention.

Figure 1:
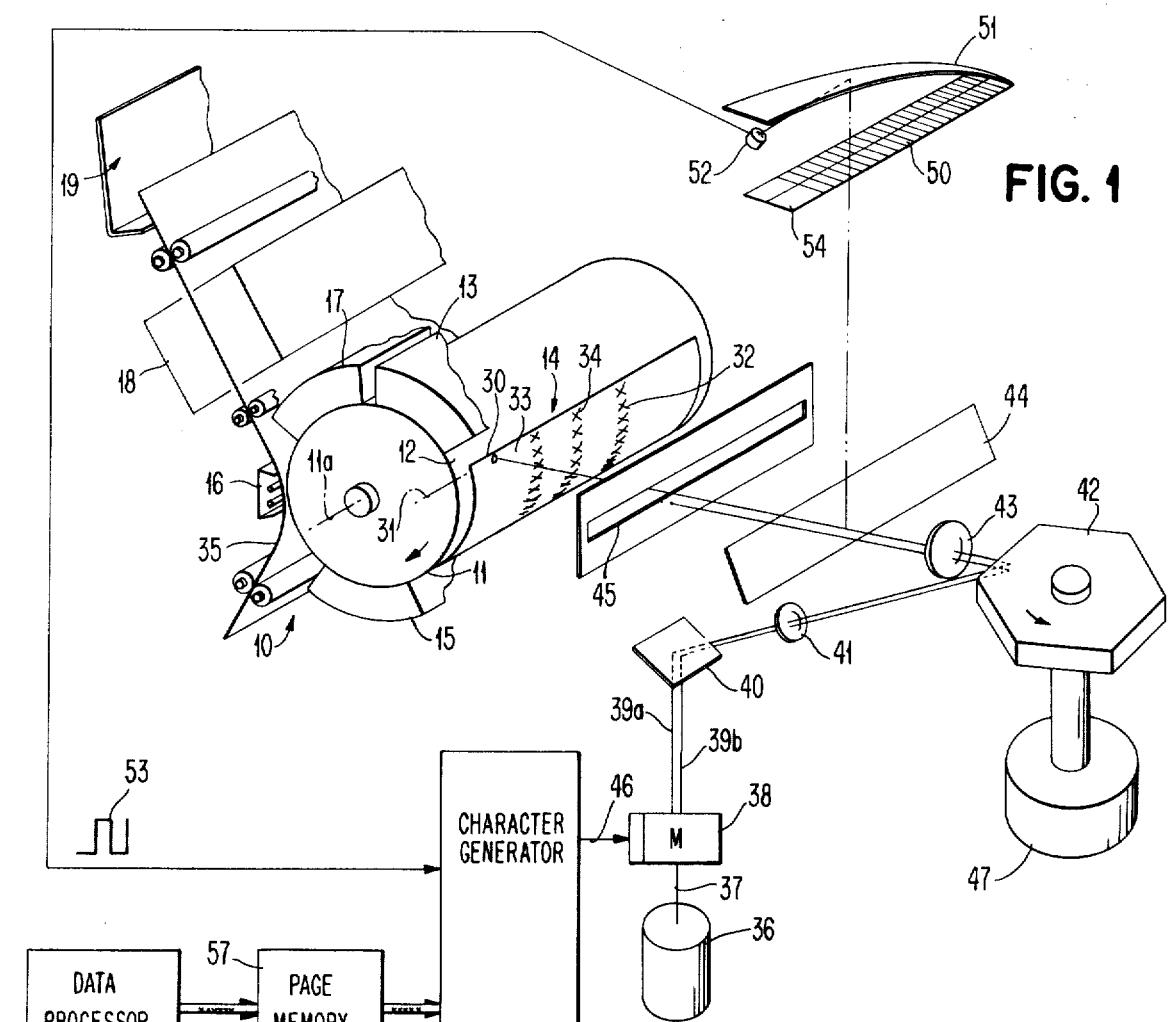
FIG. 1 is a diagrammatic view showing the organization of an optical printer having a character generator constructed in accordance with my invention.
Figure 2:
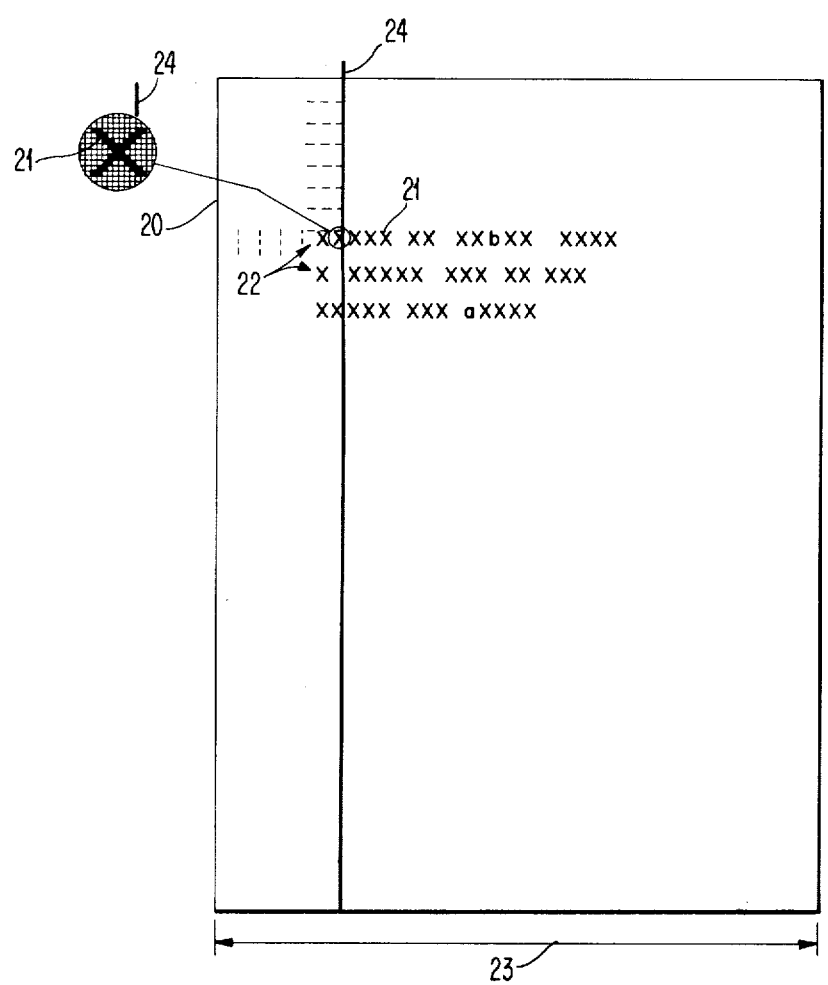
FIG. 2 is a plan view of a typical page having text printed thereon by a printer like that of FIG. 1.

In FIG. 1 there is shown a xerographic page printer 10 of preferred configuration together with a block diagram showing the primary image generation control components employed in conjunction therewith. FIG. 2 illustrates a page 20 of the type created by the printer 10. In typical fashion the page 20 bears symbols 21 arranged in lines of text 22 that read only along the short dimension 23 of the page. Returning to FIG. 1, the page printer 10 includes a xerographic type copy drum 11 providing an image receiving photoconductive surface member 12. Surface 12 is rotated successively past a charging station 13, an exposure station 14, a development station 15, a transfer station 16 and a cleaning station 17. At exposure station 14, a uniform charge applied to surface 12 at charging station 13 is selectively dissipated by a binarily controlled light spot 30 that traverses a path 31 extending parallel to the axis of rotation 11a of the drum 11. Selective exposure by the spot 30 generates binary elements of an electrostatic latent image 32 consisting of discharged white or background area 33 and charged image areas 34. The latent image 32 is presented to development station 15 where colored thermoplastic resin powder or toner is selectively deposited on the image areas 34. The thus developed image is transferred by electrostatic force at station 16 to a support sheet 35. The thus printed sheet 35 is passed through a fixing station 18 where heat or other suitable means temporarily liquifies the resin toner to case it to adhere to the sheet and form a permanent image. The sheet 35 is then delivered to an exit pocket or tray 19 where it can be removed from the machine. Any toner powder remaining on surface 12 as it leaves transfer station 16 is cleaned at station 17 prior to recharging of the surface 12 for further operation. The details of the xerographic printer are well known to those skilled in the art and form no part of this invention, therefore are not further described herein. It is to be understood that a variety of techniques exist for performing the various functions identified.

Controlled light spot 30 is preferably generated from a source of high energy coherent light such as a continuous mode laser 36 that projects a laser beam 37 along an optical path through spot control light modulator 38, redirecting mirror 40, lens 41, scan mirror 42, lens 43, beam splitting partial mirror 44, and modulation knife edge 45 to the surface 12. Modulator 38 is an acousto-optic Bragg effect device known to those skilled in the art. Modulator 38 responds to binary electrical information on its input line 46 to effectively emit the beam 37 in either of two closely adjacent but slightly different output paths 39a or 39b. If the beam 37 is emitted along output path 39a, it will ultimately be directed past the modulation knife edge 45 and strike the photoconductive surface 12 as spot 30 to discharge the surface and thereby ultimately cause white or background area to be produced on the sheet 35. Light emitted along path 39b is intercepted by the modulation knife edge 45 and thus does not strike the surface 12. The undischarged surface 12 that remains will develop a toned image at station 15 to form part of the image area on the final copy sheet 35.

Scan mirror 42 receives laser beam 37 along both paths 39a and 39b and directs it along the scanning path 31 whereby it generates a columnar segment 24 (see FIG. 2) or a single raster scan of the image of one column of page 20. Mirror 42 is configured as a regular polygon and is driven by a motor 47 at a substantially constant speed that is chosen with regard to the rotational speed of drum 11 and the size of spot 30 such that individual scanning strokes of spot 30 traverse immediately adjacent areas on the surface 12 to provide a full page exposure raster.

Beam splitting mirror 44 intercepts a fraction of laser beam 37 along both paths 39a and 39b as it is moved through its scanning motion by mirror 42 and diverts this fraction through an optical grating 50 to an elliptical mirror 51 by which the light is reflected to a photodetector 52 positioned at one foci of the mirror 51. Scan mirror 42 is located at the other foci of elliptical mirror 51 and the optical geometry of the system is selected such that grating 50 is positioned to be equivalently located relative to the exposure station 14. Photodetector 52 thus creates a train of clocking pulses 53 that is a direct measure of the scanning movement of laser beam 37 relative to the photoconductor surface 12. Conveniently, the pulses produced at photodetector 52 occur at the same rate that image elements or dots are to be defined by modulator 38 thereby enabling photodetector 52 to directly generate a gating clock signal for control of the modulator 38. For example, each half cycle of the pulse waveform 53 shown in FIG. 1 corresponds to one black or white dot. A continuous transparent portion 54 of the grating 50 is provided to enable detection of scan completion.

For specific control of modulator 38, there is provided a source of raw text data such as a magnetic card or tape reading device 55 which delivers the data to be printed to data processing apparatus 56 by which the raw data is assembled in a desired format into a page memory 57. In the page memory 57 each character or symbol to be printed as well as spaces to be inserted between symbols are recorded at individual memory addresses which are, in turn, associated with the writing lines of a normal page and with the order position of the symbol within the writing line. For example, referring to FIG. 2, a code defining symbol b on page 20 would be stored in page memory 57 at an address that is identified with the eighth writing line (seven blank lines provide a top margin) and the seventeenth order position (the left margin is composed of five blank symbols in this example).

Once the text has been assembled in page memory 57, character generation circuitry 58 operates to provide the final dot pattern control to modulator 38. In addition to page memory 57, both data processor 56 and the character generation circuitry 58 have access to memory space in additional memory 59. Memory 59 also includes the page memory access control 60 that is unique to my invention as well as font memory reference address and escapement value table in translator 70.

PAGE MEMORY ACCESS CONTROL 60 (SEE FIG. 3)

Figure 3:
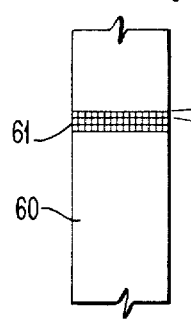
FIG. 3 is a schematic view showing the organization of a control employed in the character generator of my invention.

Page memory access control 60 is shown diagrammatically in FIG. 3. This control is preferably implemented as simply a dedicated portion of registers or memory cells 61. Each register 61 is capable of storing a character access data word 62 which is divided into page memory address portion 63 and an escapement control portion 64. The addresses of the registers 61 are sequentially ordered to facilitate their access in synchronism with light spot 30 crossing the rows of text during a vertical raster scan down the page. Each register 61 is assigned to a row on the page to be printed. These row registers 61 are addressed by row counting register 65 (FIG. 5). When addressed, row register 61 delivers a character access data word 62 along a divided data path placing page memory address portion 63 in page memory address register 67 and escapement control portion 64 in running escapement register 68.

Figure 4:
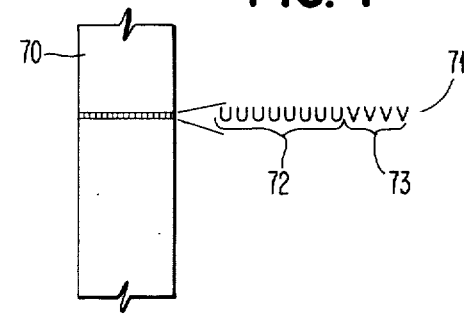
FIG. 4 is a schematic view showing the organization of a translating memory table employed in the character generator of my invention.

Reference Address and Escapement Translating Table Memory 70 (See FIG. 4)

Translator 70 is a read only storage memory containing a series of individually addressable multibit font access data words 71 each of which is uniquely addressable by a character/symbol identifying code from page memory 57. Each font access data word 71 contains a font address portion 72 which is a reference address to font memory 92 and a total escapement portion 73 which indicates the total number of raster scans that are required to completely generate the symbol, i.e., total symbol escapement.

The font access data words 71 are individually addressable by the symbol identifying codes from page memory 57 as presented in address register 75 in combination with one or more status bits 76 therein which are preset to select a particular type font or printing mode. The status bits 76 enable the selection of basically different data from font memory 92 including different type styles and/or different proportionally spaced type styles. Bits in the symbol identifying code other than static bits are character code bits and indicate the character or symbol to be printed. For example if font memory 92 is provided with three different proportionally spaced type styles, the selection of which type style and which character will be employed is made by the font address from font address and escapement table memory device 70 (translator 70) as determined by the character code and by status bits 76. All of the type fonts need not be of the proportional spacing type, however. If it is desired to have a fixed space type font, translating memory 70 is simply coded to identify the same number of strokes for each character in the type font. Furthermore, if it is desired to print writing lines extending the long dimension of a page, a rotated font may be stored in font memory 92 and selected by status bits 76. The rotated font specifies the contrast control pattern required to produce symbols by raster scans that horizontally traverse the symbols.

CHARACTER GENERATING CIRCUITRY 58

A more detailed functional component breakdown of the character generating circuitry 58 with page memory 57, control 60 and translator 70 is shown in FIG. 5. Page memory 57 has an output data path 74 to the address register 75 by which a symbol identification code with status bits is input to the translator 70 as an address. The output path 80 of translator 70 is divided into two components, namely, a font memory reference address path 81 that delivers the font address portion 72 (FIG. 4) to register 82, and a total escapement value path 83 that delivers the total escapement portion 73 (FIG. 4) to total escapement register 84. When the value in running escapement register 68 is "zero", detection circuit 85 gates selective data path 86 to pass the total escapement portion 73 (FIG. 4) from register 84 to remaining escapement register 87 where it is applied along with the font address portion 72 from register 82 delivered to font memory addressing subtraction logic 90 to produce a specific font memory address in address register 91 of a font memory 92. If the data in running escapement register 68 is not detected by circuit 85 to be "zero", then selective data path 86 passes to register 87 the running escapement decremented by one and not the total escapement from register 84.

Figure 6:
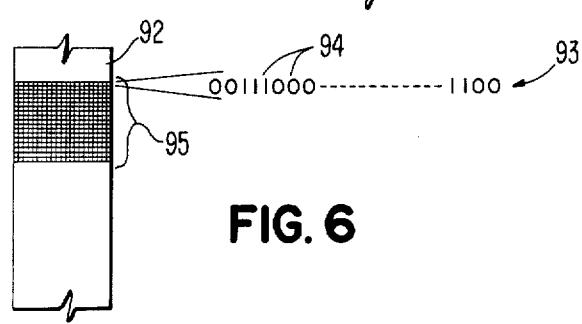
FIG. 6 is a schematic view showing the organization of a type font memory employed in the character generator of my invention.

FIG. 6 illustrates the organization of font memory 92 which stores a plurality of character scan data words or bit series 93 the bits 94 of which identify either a light or dark dot. Each character scan data word 93 is accessed by an address applied to address register 91 (FIG. 5) and defines the light/dark contrast pattern necessary to generate a single raster scan of a symbol such as 21 in FIG. 2. As complete generation of each symbol requires a plurality of raster scans, a like plurality of character scan data words 93 is provided in font memory 92 thus forming an entire character/symbol group 95 of data bits which define the contrast pattern for the related symbol as correlated with an appropriate raster pattern. Conveniently the addresses of adjacent data words 93 correspond to adjacent raster scans of the symbol and thus differ by the constant "one". It will be recognized by those skilled in the art that various compression coding techniques could be employed instead of bit-for-bit light/dark coding of the word 93 as herein shown. A character scan data word 93 is addressed by subtracting the remaining escapement in register 87 from the font memory reference address in register 82. The reference address for the character to be printed is the actual address of the last character scan data word 93 for the character group 95 making up the character to be printed. During the first raster scan for a character, the total escapement is subtracted from the reference address to give the address of the first character scan data word 93 in the character group 95. During each successive raster scan, the escapement is decremented by "one" and subtracted from the reference address. In this way, successive, character-scan data words are addressed from first scan to last scan in a character group 95.

The scan contrast pattern from font memory 92 addressed by register 91 is delivered on output lines 96 to output control serializing buffer 97. The individual bits of the contrast pattern loaded into output buffer 97 are gated to modulator 38 by the pulses 53 (FIG. 1).

The remaining escapement count applied to subtraction logic 90 is also applied to an input or record-in buffer 69 of the page memory address control 60 via data lines 88. A different portion of input buffer 69 receives a page memory address from register 67 updated if necessary by update summing logic 100. Whenever a detection circuit 101 determines the value in register 68 to be "one" indicating production of the final scan required for an individual symbol, update logic 100 is thereby enabled to add a constant to the address in register 67 thereby deriving the address in page memory 57 of the next successive character in that particular row of text. Ordinarily, the constant added will be "one"; however, for reasons hereinafter developed in greater detail, printing of a rotated font wherein writing lines or rows extend along the long dimension of a page is facilitated by making the number added by update logic 100 to be equal to the number of character positions in a writing line. This selective increment is accomplished by data processor 56 (FIG. 1) providing an increment to be added and storing the increment in addend register 102. The information in buffer 69 is recorded into the stage 61 of register 60 addressed by the page memory address control row counting register 65 as that stage corresponding to the row associated with the page memory address recorded therein.

Row counting register 65 is incremented by counting logic 103 once for each character scan timing pulse (described hereinafter under the heading "Cycle Clock") which represents the traversal by light spot 30 of the columnar segment allotted to a character/symbol 21, i.e. a single raster scan across the height of a row. Row counting register 65 is reset by a signal generated when photodetector 52 receives light through continuous clear space 54 at the end of grating 50 in FIG. 1; i.e. a single raster scan down the page. Thus, each row register of control 60 is successively addressed for read-out and write-in by row counting register 65 operating in synchronism with the scanning travel of light spot 30 (FIG. 1).

DATA FLOW OPERATION

Initially data processor 56 (FIG. 1) sets up control 60 so that each row register 61 contains the address in page memory 57 of the first character in the row of text associated with the row register and the value "zero" as the escapement control or running escapement.

As each row register 61 of page memory address control 60 is accessed by row counting register 65, its contained character access data word 62 is divided and presented to registers 67 and 68. Page memory address 63 (FIG. 3) in register 67 is used to access page memory 57 and is also returned through update logic 100 to the input buffer 69 as described above. The page memory address in register 67 permits page memory 57 to read out the symbol identifying code to register 75. The symbol identifying code in register 75 permits translator memory 70 to read out the font memory reference address to register 82 and the total escapement to register 84. If "zero" is detected in the running escapement register 68 by zero detect circuitry 85, the total escapement information contained in register 84 is simply transferred to register 87. Otherwise, the running escapement information contained in register 68 is decremented by "one" in logic 104 and passed to register 87. The same information is passed to the input buffer 69 of the page memory address control register 60.

As the vertical raster scan proceeds down the page, each character scan timing pulse, indicating scan has crossed a row, causes counting logic 103 to advance by "one" the count in row counting register 65. Initially the register 65 is reset to "one" corresponding to the first row on the page. As the raster scan moves down the page, the count in row counting register 65 is advanced, and at any given instant the count corresponds to the row on the page that the scan is presently moving across. Thus the row registers 61 in control 60 are addressed in synchronism with raster scan. Accordingly, in successive scans down the page each address stored in a row register 61 of control 60 will be presented at address register 67 for the number of times required to generate the raster strokes or scans for display of its identified symbol. This number corresponds to the total escapement information read from translating memory 70. When a given symbol in a given row or writing line has been completely displayed, as detected by the "one" in register 68 by one detect circuitry 101, the page memory address is incremented by update logic 100. The updated page memory address is the address in page memory of the next character in the same row so that during the succeeding scan a new symbol code will be derived on output data path 74 from page memory 57. During the succeeding scan, a "zero" will be presented to register 68 which will be detected by circuit 85 to enable the new total escapement derived from translating memory 70 to be presented to subtraction logic 90 and to be stored in the associated row register 61 in control 60 along with the updated page memory address.

PAGE MEMORY 57

Page memory 57 can be implemented by any of several well known high speed memory techniques. The memory stores a plurality of symbol identifying data words that are individually accessible by specifying one of a series of sequential addresses. The symbol identifying data word at a specific address will be a coded representation of an alphabetic or numeric character identified as being either upper or lower case and indicating whether or not the character is to be underscored. In addition, the character encoded may be a "space" character (SP) of either of two or more widths (number of raster scans or columnar segments 24) when proportional spacing is desired. The page memory 57 is loaded by the data processor 56 in accordance with a formatting program such that successive addresses are allotted to successive characters in the text. For example, for addresses beginning with "address 20", the following text would be stored thusly:

| 20 | 21 | 22 | 23 | 24 | 25 | 26 | 27 | 28 | 29 |
|----|----|----|----|----|----|----|----|----|----|
| T  | h  | e  | SP | q  | u  | i  | c  | k  | SP |
| 30 | 31 | 32 | 33 | 34 | 35 | 36 | 37 | 38 | 39 |
| b  | r  | o  | w  | n  | SP | f  | o  | x  | SP |

In order to format the text into rows for presentation on a page, "end of row" (ER) codes are inserted by the data processor 56 and the next succeeding address is recorded as the initial address in the row register 61 of page memory access control 60 corresponding to the next succeeding row. For example: assume that the "line 6" of a page began at "address 20", and that the line was to end after the word "brown", the page memory 57 would be loaded by the data processor 56 as follows:

| 20 | 21 | 22 | 23 | 24 | 25 | 26 | 27 | 28 | 29 |
|----|----|----|----|----|----|----|----|----|----|
| T  | h  | e  | SP | q  | u  | i  | c  | k  | SP |
| 30 | 31 | 32 | 33 | 34 | 35 | 36 | 37 | 38 | 39 |
| b  | r  | o  | w  | n  | ER | f  | o  | x  | SP |

In this example, the row register 61 of page memory access control 60 corresponding to "line 7" would be initialized to show "address 36". As hereinafter explained, a special "End of Scan" code ES makes it unnecessary to insert separate space codes for the left margin. One example of similar techniques employed in loading a page memory like 57 is found in U.S. Pat. No. 3,654,611. In addition, those skilled in the art will recognize that assembling of texts into the format thus illustrated is well within the current skill of the data processing arts.

The End of Row code detector 115 (FIG. 5) is connected to inhibit address incrementing by update logic 100. The page memory address containing the ER code is simply repeatedly accessed during successive scans. Translating memory 70 selects a "blank" data word from font memory 92 in response to the ER code.

If desired, End of Page logic 106 can monitor the codes delivered to register 75. If an entire scan by light spot 30 of a columnar segment 24 is accomplished with no symbol identifying codes being delivered to register 75, End of Page logic 106 overrides control of modulator 38 to print "white" for the remaining scans of the page. During this time page memory 57 and page memory access control 60 are free to be loaded by processor 56 with text of the next page to be printed. Alternately, the End of Page function can be implemented by an End of Page symbol code stored in Page Memory 57.

END OF SCAN CONTROL

In addition to the special control character referred to above as ER (End of Row), I provide an End of Scan control code ES that also is loaded by the data processor 56 into page memory 57. The ES code designates that for the remainder of the immediate scan of light spot 30 only blank space is to be printed. The special ES code is normally recorded in the page memory 57 in the first several addresses of the page memory 57 to define the left margin and following the last line of text. For example, if a page was to have a 9 space wide left margin and a last line of text beginning at page memory "address 250", the page memory 57 would be recorded thusly:

| 1   | 2   | 3   | 4   | 5   | 6   | 7   | 8   | 9   |     |     |     |     |     |     |     |
|-----|-----|-----|-----|-----|-----|-----|-----|-----|-----|-----|-----|-----|-----|-----|-----|
| ES  | ES  | ES  | ES  | ES  | ES  | ES  | ES  | ES  |     |     |     |     |     |     |     |
| 250 | 251 | 252 | 253 | 254 | 255 | 256 | 257 | 258 | 259 | 260 | 261 | 262 | 263 |     |     |
| t   | o   | SP  | t   | h   | e   | SP  | a   | i   | d   | SP  | o   | f   | SP  |     |     |
| 264 | 265 | 266 | 267 | 268 | 269 | 270 | 271 | 272 | 273 | 274 | 275 | 276 |     |     |     |
| t   | h   | e   | i   | r   | SP  | P   | a   | r   | t   | y   |     | ER  |     |     |     |
| 277 | 278 | 279 | 280 | 281 | 282 | 283 | 284 | 285 | 286 | 287 | 288 | 289 |     |     |     |
| ES  | ES  | ES  | ES  | ES  | ES  | ES  | ES  | ES  | ES  | ES  | ES  | ES  |     |     |     |

Control 60 is initialized in its row register 61 corresponding to "line 1" to "address 1"; in its row register 61 corresponding to the last line of text to "address 250" and in its row register 61 corresponding to the line following the line of text to "address 227." The ES code is decoded as a blank character of a given escapement, for example, four units width, and is recorded by the data processor 56 a sufficient number of times at the end of the text to cover the entire unit width of the typing page at the end of text. In addition, the ES code is detected by End of Scan detect circuit 107 which sets latch 108 to inhibit further operation of counting logic 103. Repeated cycles of page memory access control 60 thus repeatedly produce the page memory address at register 67 that contains the ES code until row counting register 65 and latch 108 are reset by the scan completion signal from photodetector 52.

CYCLE CLOCK

Figure 7:
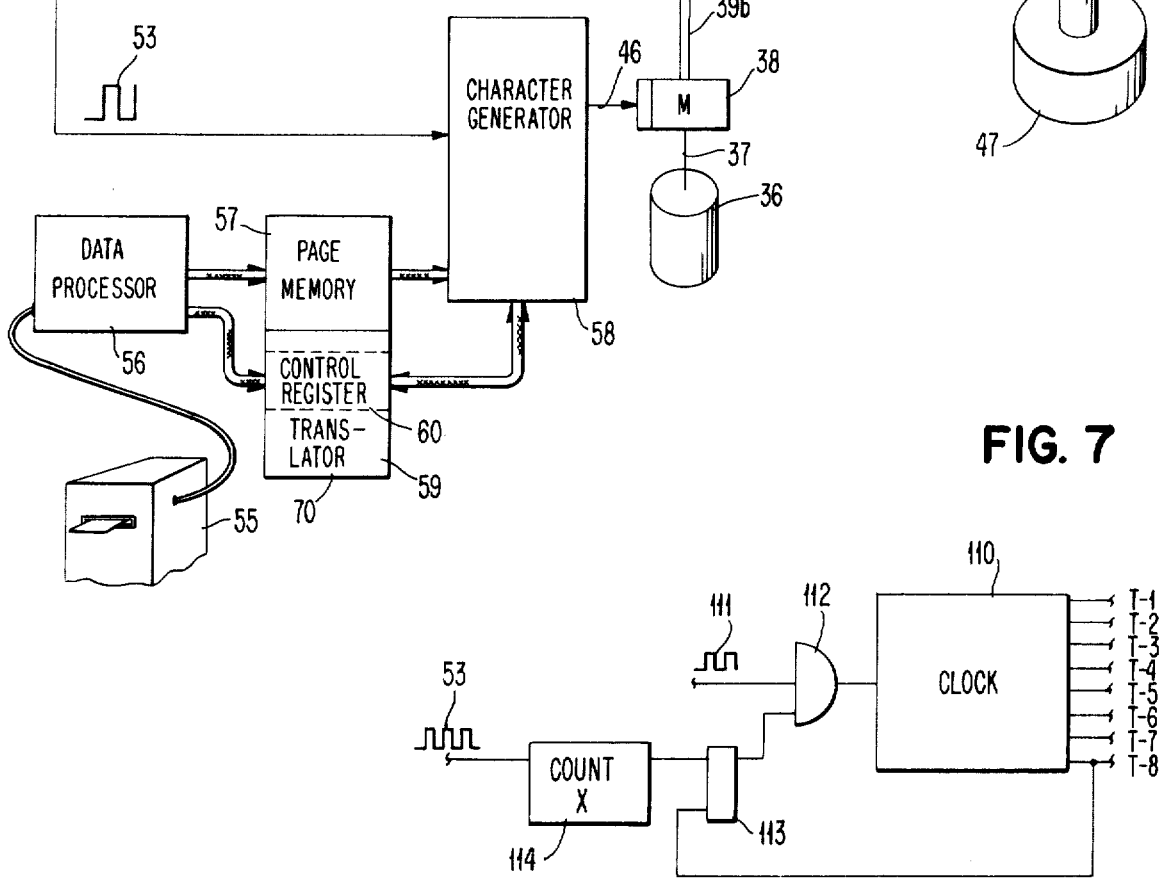
FIG. 7 is a diagrammatic view showing a cycle control clock used in the character generator of my invention.

In accordance with well known data processing techniques, the various operations of my character generator are controlled in sequence by clock circuitry 110, see FIG. 7, that defines an 8 step operating cycle that is produced during the time required for light spot 30 to traverse one symbol segment; i.e. raster scan across one row. Clock circuitry 110 counts pulses 111 from a regulated oscillator, not shown, so long as AND gate 112 is enabled by synchronizing latch 113. Image dot counter circuit 114 receives scan indicating pulse train 53 (FIG. 1) and emits an output pulse to set latch 113 after counting a predetermined number of pulses of train 53 equal to the length of scan for generating an individual character segment. Clock circuitry 110 creates times T-1 through T-8 sequentially in less time than occurs between output pulses of counter 114. At the time T-8, latch 113 is reset to disable gate 112 until a new output pulse is received from dot counter 114. Also at time T-8 the counting logic 103 is activated to increment the row counting register 65 by one.

Signals T-1 through T-8 representing individual cycle times are employed as gate signals to the data flow aths shown in FIG. 5 to produce a cycle having the following operating sequence:

- T-1 — Using the row address in row counting register 65, read from control 60 into page memory address register 67 and running escapement register 68.
- T-2 — Using the page memory address in register 67, read symbol identifying code from page memory 57 into register 75.
- T-3 — Using the symbol identifying code in register 75, read from translating memory 70 into font memory reference address register 82 and total escapement register 84.
- T-4 — Test running escapement register 68 for "zero", if register 68 is "zero" transfer total escapement from register 84 to register 87; if register 68 is not "zero", subtract "one" and transfer it to remaining escapement register 87.
- T-5 — Test running escapement register 68 for "one" and test symbol identifying code in register 75 for ER, if register 68 is "one" and if register 75 does not contain ER, add a constant to page memory address in register 67 and transfer it to buffer register 69; if running escapement register 68 is not "one" or if register 75 contains ER, transfer page memory address in register 67 to buffer register 69. Test register 75 for ES, if register 75 contains ES set latch 108.
- T-6 — Subtract remaining escapement in register 87 image of font memory reference address in register 82 and transfer difference to register 91. Transfer remaining escapement in register 87 to buffer register 69.
- T-7 — Using register 91 as an address, read character scan data from font memory 92 to output serializer buffer 97; using row counting register 65 as address, write buffer register 69 into appropriate row register 61 in page memory address control 60.
- T-8 — Test if latch 108 is set, if latch 108 is not set, add "one" to row counting register 65.

Preferably pipelining techniques are employed to allow overlap processing of the data for several successive scans and thereby obtain faster operation. The foregoing description adequately shows the operating principles of my invention without the added complication of such state-of-the-art enhancement techniques.

HEADING MODIFICATION FOR ROTATED TYPE FONT

Figure 8:
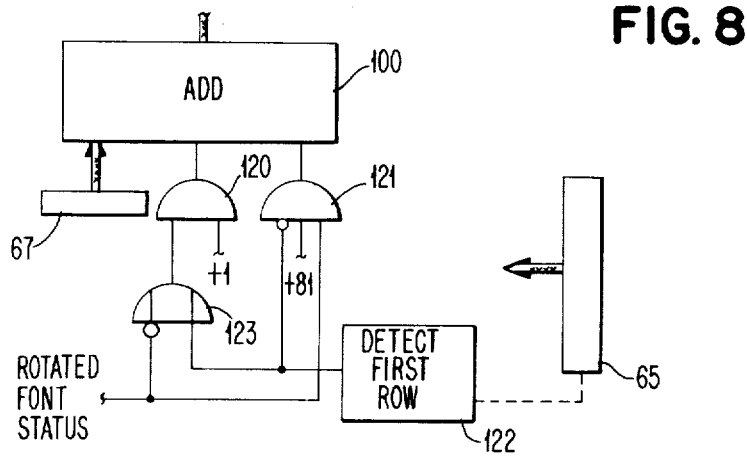
FIG. 8 is a diagrammatic view illustrating an improved feature of my invention.

As shown in FIG. 8, additional circuitry has been provided to update summing circuitry 100 which updates the page memory address from register 67, see FIG. 5. This circuitry enables the rotated font status, as preset by an operator, to control the progression of addresses in page memory 57. As described above, in normal printing the rotated font status is not selected and the number "one" is delivered through AND circuit 120 for addition to page memory address register 67 upon the detection of a "one" in running escapement register 68 by circuitry 101. When the rotated font status is selected, AND circuit 121 will be enabled to gate the number "81" to update summing circuitry 100 to be added to the page memory address from register 67. The number "81" provides storage of an 80 character line of text and an ES code. As shown in FIG. 8, I have elected to inhibit output of AND circuit 121 upon detection by logic 122 of the first row designated by counting address register 65, and instead cause OR circuit 123 to enable AND circuit 120 to add "one" in all progressions within the first line. As shown by the following example, this technique enables me to dedicate the first row of rotated font printing, which normally is a margin area anyway, to definition of completely blank scans thereby effecting a considerable savings of storage area in page memory 57.

Figure 9:
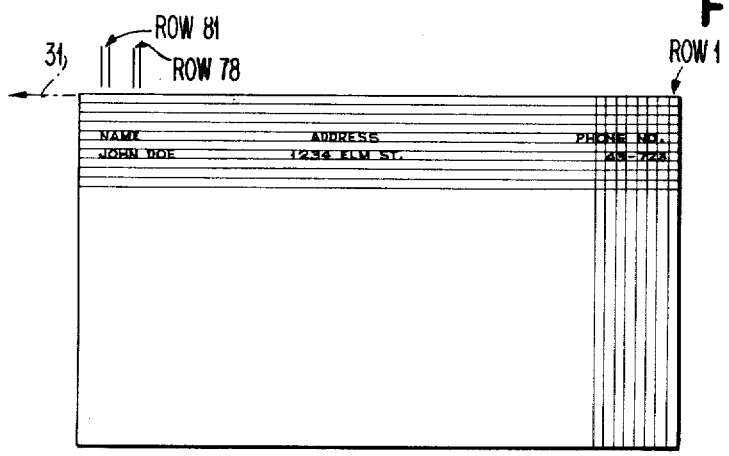
FIG. 9 is an illustration of a sample page printed utilizing the modification of FIG. 8.

The example is illustrated in FIG. 9 which shows a sample of a page to be printed. Recall that the raster scan occurs along a path 31 in the direction of the long dimension of the page. It can be seen that a number of raster scans providing the top margin of the page above the words "name", "address", "phone number" are completely blank as is one line between the words "name", and "John". To avoid having to record in the page memory 57 space codes or blank codes corresponding to these completely blank lines, the first twenty-eight page memory addresses corresponding to the twenty-eight possible lines of text on the page are recorded with ES if the line is to be blank and SP if the line is to contain text. Having thus established a certain vertical format by the recording of ES and SP codes, the text to be printed is then recorded in left-to-right reading fashion in successive page memory addresses exactly as was done in "the quick brown fox" example set forth above with the one exception that the initial addresses recorded in page memory access control 60 are those addresses in which the characters and spaces making up the first line of text "name", "address", "phone number" are recorded. For example, in the row register 61 of page memory access control 60, corresponding to row 81 page memory "address 30" will be recorded as containing the initial character to be accessed when scanning row 81. The page memory 57 for this example would be recorded as follows:

| 1 | 2 | 3 | 4 | 5 | 6 | 7 | 8 | etc | 28 | 29 | 30 | 31 | 32 | 33 | — | — | — | — |
|---|---|---|---|---|---|---|---|-----|----|----|----|----|----|----|---|---|---|---|
| ES | ES | ES | ES | SP | ES | ES | SP | ... | ES | ES | N | A | M | E | | | | |
| — | — | — | — | 110 | 111 | 112 | 113 | 114 | | | | | | | | | | |
| | | | | ES | J | o | h | n | | | | | | | | | | |

Note that page memory "address 111" containing the J of John which falls directly beneath the N of NAME differs from the address containing the N by the number 81, which is the number of character positions along the long dimension of the page — plus one to allow recording of an ES code.

Considering now the sequence of events involved in printing the page shown in FIG. 9, with initial scanning, row counting register 65 will specify that the address contained in the row register 61 corresponding to row 1 be presented to page memory address register 67 thereby addressing page memory address 1 which contains an ES code. As stated above, the ES code inhibits further counting by logic 103 until reset by a scan complete signal detected when the scan crosses the blank 54 at end of grating 50 (FIG. 1). Thus, the ES code will be repeatedly presented to cause blank printing for a plurality of strokes or scans as encoded as escapement therewith in translating memory 70. Upon completion of the number of scans associated with the ES code, detection circuit 101 will detect a "one" in register 68 and through the logic shown in FIG. 8, the first row detection from counting register 65 will cause AND circuit 120 to add "one" to the page memory "address 1" thus bringing the address associated with the first row to "address 2". Again, the ES code has been recorded in address 2 and the same sequence of events will be repeated. When the address in register 60 associated with the first row has been advanced to contain page memory "address 5," a space code SP will be derived from page memory 57. While the space code will itself produce no printed output, it does not function to inhibit counting logic 103 as did the ES code. Thus counting register 65 is allowed to successively bring out each of the data words contained in its row registers 61 which, it will be recalled, were initialized to specify in sequence those page memory addresses associated with the first line of text to be printed.

The initial sequence of this example will begin at "address 5", proceed to "address 109" which was initially recorded in the stage 61 corresponding to row 2, and continue down to "address 29" which was initially recorded in the row register 61 corresponding to row 82. As the final scan of the printing of the first line of text is occurring, circuit 101 will detect "one" at each of the row registers 61 of control 60. When the row register 61 associated with the first row is detected, update summing circuitry 100 will be governed by AND circuit 120 to simply add "one" to the previous address which was 5 and thereby derive "address 6" as the updated address. When, however, any other row register 61 is being processed such as that associated with row 78, AND circuit 121 will be satisfied, thereby gating the number 81 to update summing circuitry 100 to change "address 33" to "address 114" thereby specifying the address in page memory 57 containing the letter N which is to appear below the letter E. During the next succeeding scan, the first row register of control 60 will call out address 6 of the page memory 57 which again contains an ES code. Counting logic 103 will be inhibited and a column of white will be printed. The same sequence will occur when the first row register of control 60 has advanced one to specify page memory address 7. Only when the first row register 61 of control 60 has advanced to page memory "address 8" will the updated text containing addresses in the remaining registers of control 60 be presented to the page memory 57.

PREFERRED MODIFICATION

Figure 10:
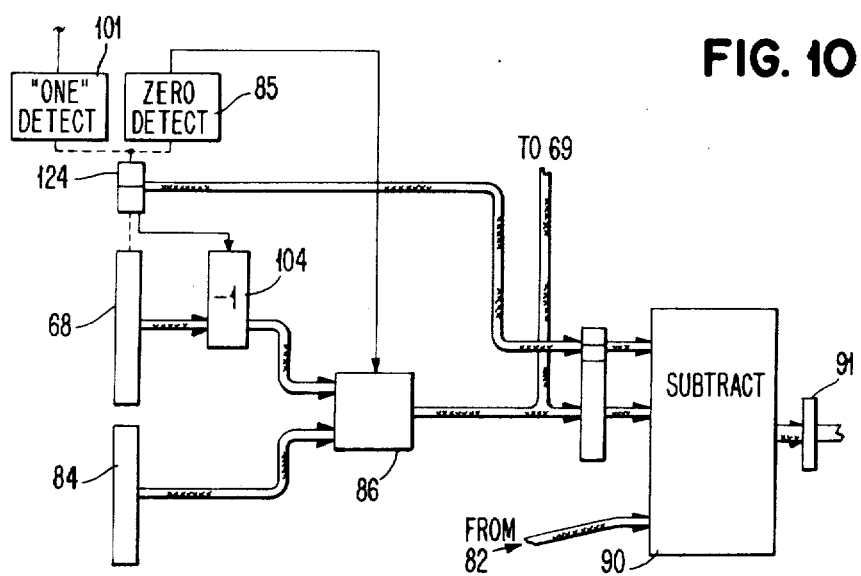
FIG. 10 is a diagrammatic view illustrating a preferred implementation of a portion of the character generator more generally illustrated in FIG. 5.

While the total number of scans required for a given character can be stored in memory 70 and processed repeatedly through page memory access control 60, I prefer to employ a two bit or four state counter 124 as shown in FIG. 10, to supplement the number provided by registers 84 and 68 such that these registers need only store a number equal to one-fourth of the total number of required scans. Character widths thus are specified in terms of a number of space units, each space unit being equal in width to four raster scans or columnar segments 24. The principles of my invention as described above in connection with FIG. 5 remain the same with the only difference being that four state counter 124 is interpreted along with the contents of register 68 by "zero" detection logic circuit 85 and "one" detection logic circuit 101 and decrementing circuit 104 only decrements the contents of register 68 once for each full four-step cycle of counter 124.

Counter 124 is incremented upon the occurrence of a stroke or scan completion signal generated by photodetector 52 when it receives continuous light through grating portion 54. The scan completion signal also operates to reset row counting register 65 to again specify the initial row register 61 of page memory access control 60.

Having thus described both the principles employed in the character generator of my invention and some preferred illustrative implementations thereof, it will be understood that various modifications, additions, and deletions can be made to the specific materials disclosed without departing from the inventive concept as limited only by the appended claims.

I claim:

1. Apparatus for progressively generating an imageof a page bearing rows of symbols on an image receiving member by traversing binary image element generating means relative to said image receiving member to generate columnar segments of said page image, said apparatus including means producing a train of clocking pulses that is indicative of the relative position of said binary image element generating means in its traversal of a columnar segment, cycle control means responsive to said clocking pulses for defining successive operating cycles, and means controlling said binary image element generating means during said operating cycles, wherein the improvement comprises:

a page memory having a plurality of individually addressable storage cells for storing a plurality of symbol identifying codes at storage addresses each of which is individually associatable with a respective one of said rows and with an order position within its respective one row, first page memory access control means for identifying successive ones of said rows during successive ones of said operating cycles, second page memory access control means controlled by the identification of a row by said first page memory access control means for specifying in conjunction therewith an address in said page memory associated with a discrete order position of a symbol to be generated within the row identified, said second page memory access control means having a plurality of row registers for storing respective ones of a plurality of sequentially retrievable character access data words, each of said row registers being individually associated with a respective one of said rows, each of said character access data words identifying at least the order position of a symbol or character to be generated in said respective one row, a font memory storing a plurality of data bits in discrete groups each of which defines a contrast control pattern which when displayed in synchronism with a correlated raster generates the configuration of a symbol, each of said groups containing a predetermined plurality of discrete bit series each of which defines a contrast control sub-pattern which when displayed in synchronism with the traversal of said binary image element generating means generates a columnar segment of the respective symbol, said bit series each being uniquely accessible by discrete font addresses, the font addresses of those bit series which define adjacent columnar segments of the same symbol differing by a constant amount, translating means responsive to an individual symbol identifying code accessed from said page memory for deriving data defining a reference font address in said font memory associated with that group of data bits which is associated with the symbol identified by said accessed code, columnar segment counting means for determining the remaining number of said predetermined plurality of bit series to complete the generation of a symbol, font memory addressing means for cyclically addressing different ones of said bit series by deriving font addresses from said reference addresses and said remaining number of said predetermined plurality of bit series, output control means for delivering the bit series addressed by said font memory addressing means to said binary image element generating means in synchronism with the traversal thereof for displaying the contrast pattern defined by said addressed bit series, and update logic means operated upon access of the final one of said predetermined plurality of said bit series for modifying the page memory address to be specific by advancing by one the associated symbol order position in the associated stage of said register means.

2. Apparatus as defined in claim 1 wherein an "end of scan" control code may be stored in said page memory at a storage address therein, said "end of scan" control code identifying a data bit group in said font memory forming a blank space character and wherein the improvement further comprises:

means responsive to detection of said "end of scan" control code being accessed from said page memory for causing blank space generation by said binary image element generating means throughout the remainder of its traversal of a columnar segment.

3. Apparatus as defined in claim 2 wherein the improvement further comprises:

means responsive to detection of said "end of scan" control code being accessed from said page memory for inhibiting further cyclic operation of said first page memory access control means for the remainder of said traversal of a columnar segment by said binary image element generating means.

4. Apparatus as defined in claim 1 wherein the storage addresses in said page memory of all symbols to be generated within a given one of said rows differ by a constant number and wherein the improvement further comprises:

summing means in said update logic means for advancing the identification of the order position of the symbol to be generated in its respective row by one by adding said constant number to the page memory address specified by said register means.

5. Apparatus as defined in claim 1 wherein said rows of symbols comprise lines of text and wherein said predetermined plurality of said bit series in each group is proportioned in number to the display width of the symbol whose contrast control pattern is defined thereby, wherein the improvement further comprises said second page memory access control means storing in each of said data words a numeric indication of the remaining number of said predetermined plurality of bit series required to complete generation of the symbol whose order position is identified in the data word, said translating means further deriving a numerical indication of the predetermined plurality of said bit series in the group identified by the associated reference address, means operative upon the first presentation by said register means of a data word after the advancement of its respective symbol order position by one for recording the numerical indication derived from said translating means into the associated stage of said register means, and said columnar segment counting means comprising means to decrement said numerical indication stored in said data word as a function of the number of operating cycles during which said data word is retrieved from said register means.

6. In a character generating system driven by a data processor where said processor formats symbol identifying codes into a plurality of rows of text and said generating system generates characters with a raster scan across a plurality of rows of text during each scan so that portions of a plurality of characters are generated successively during each scan, apparatus for accessing character scan data words corresponding to one scan through a proportional width character whereby a plurality of rows of proportional width characters are generated simultaneously as the raster scan is indexed scan by scan along the length of the rows, said accessing apparatus comprising:

first memory means for storing character pattern information for a character at a font reference address, said character pattern information stored as character scan data words with one data word for each single raster scan through a character, each character scan data word being located at a character scan address relative to the font address;

second memory means connected to said data processor for storing a symbol identifying code for each symbol in a row of text, each of said symbol identifying codes is stored at an access address determined by said data processor, said second memory means translating each accessed symbol identifying codes into a font reference address and a total escapement for the symbol;

control means connected to said data processor for registering for each row of text the access address and the remaining escapement or number of scans to complete the character for the character currently being generated by the raster scan, said control means being initialized by said data processor to the access address for the first character in each row of text, said control means controlling access to said second memory means whereby said second memory means is accessed to indicate the font reference address for the character being generated;

means for synchronizing said control means with the raster scan across the rows whereby the font reference address and the remaining escapement for the character being generated in each row are available in synchronism with the raster scan as the scan across acros each row;

means connected to said control means and said second memory means for indexing to the character scan address in said first memory means based upon the font reference address and total escapement from said second memory means or the remaining escapement from said control means;

said first memory means connected to said indexing means and responsive to the character scan address for passing the character scan information to the character generating system as the raster scan moves across the row in which the character is being generated.

7. The accessing apparatus of claim 6 and in addition:

escapement updating means connected to said control means for updating the remaining escapement in said control means during the present scan through the row in preparation for the next scan across the same row;

access updating means connected to said control means for updating the access address in said control means for the next character in the same row when the character currently being generated in the row is being completed by the present scan whereby proportional width characters may be generated scan by scan by the same raster scan moving across a plurality of rows of text during a single scan.

8. The accessing apparatus of claim 7 wherein said control means comprises:

a plurality of row registers, each row register associated with a row of text to be generated, each of said row registers storing an access address to access a symbol identifying code in said second memory means for the symbol presently being generated in the row associated with the row register, each of said row registers also storing the remaining escapement to complete the symbol currently being generated in the row;

means connected with said synchronizing means for selecting said row registers in synchronism with the raster scan across the rows of text so that each row register is selected as the raster scan crosses the row associated with the register.

9. The apparatus of claim 8 wherein:

said escapement updating means decrements the remaining escapement by one and returns the updated remaining escapement to the row register currently selected by said selecting means;

said access control updating means adds a predetermined count to the access address in the row register, the updated access address is returned to the row register currently selected by said selecting means whereby the row register is updated for the next scan across the same row of text.

10. The apparatus of claim 6 wherein said second memory means comprises:

code storing means for storing character symbol identifying codes at each access address;

translation means connected to said code storing means for converting each symbol identifying code into a reference address and a total escapement.

11. Method of generating proportional width characters with a single pattern of raster scans where each pattern generates at least two characters simultaneously comprising the steps of:

dividing each scan of the raster scan pattern into portions allotted to each of the characters being generated;

storing character pattern information as sets of character scan data words where each data word contains character generation information for one of said raster scan portions for one character;

controlling the character generation during each portion of each raster scan in accordance with the character scan data word allotted to the character being generated;

accessing the character scan data words in accordance with the portion of the raster scan currently generating a character and in accordance with the number of character scan data words previously accessed for the character being generated whereby each character is generated independently of other characters being generated during the same raster scan pattern.

* * * * *

UNITED STATES PATENT AND TRADEMARK OFFICE
CERTIFICATE OF CORRECTION

PATENT NO. : 4,000,486

DATED : December 28, 1976

INVENTOR(S) : Robert Ray Schomburg

It is certified that error appears in the above-identified patent and that said Letters Patent are hereby corrected as shown below:

Column 16, line 64, "across acros" should be --moves across--.

Signed and Sealed this

Fifth Day of April 1977

[SEAL]

Attest:

RUTH C. MASON
*Attesting Officer*

C. MARSHALL DANN
*Commissioner of Patents and Trademarks*